(12) United States Patent
Imakura et al.

(10) Patent No.: US 10,538,119 B2
(45) Date of Patent: Jan. 21, 2020

(54) TRANSFER FILM

(71) Applicant: Dai Nippon Printing Co., Ltd., Tokyo (JP)

(72) Inventors: Yoshihiro Imakura, Tokyo (JP); Ryoji Hattori, Tokyo (JP); Kazuya Yoshida, Tokyo (JP); Hiroyuki Hasegawa, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/762,193

(22) PCT Filed: Sep. 27, 2016

(86) PCT No.: PCT/JP2016/078386
§ 371 (c)(1),
(2) Date: Mar. 22, 2018

(87) PCT Pub. No.: WO2017/057325
PCT Pub. Date: Apr. 6, 2017

(65) Prior Publication Data
US 2018/0272779 A1 Sep. 27, 2018

(30) Foreign Application Priority Data
Sep. 28, 2015 (JP) .................................. 2015-190421

(51) Int. Cl.
*B41M 5/42* (2006.01)
*B32B 27/26* (2006.01)
(Continued)

(52) U.S. Cl.
CPC ............... *B41M 5/42* (2013.01); *B32B 7/06* (2013.01); *B32B 27/06* (2013.01); *B32B 27/08* (2013.01);
(Continued)

(58) Field of Classification Search
CPC .... B41M 5/382; B41M 5/38214; B41M 5/40; B41M 5/405; B41M 5/44; B41M 5/50;
(Continued)

(56) References Cited

U.S. PATENT DOCUMENTS 5,344,808 A 9/1994 Watanabe et al.
6,254,970 B1 7/2001 Hiatt et al.
(Continued)

FOREIGN PATENT DOCUMENTS

JP H06-183184 A1 7/1994
JP H10-297122 A1 11/1998
(Continued)

OTHER PUBLICATIONS

Extended European Search Report (Application No. 16851496.6) dated Sep. 3, 2018.
(Continued)

*Primary Examiner* — Gerard Higgins
(74) *Attorney, Agent, or Firm* — Burr & Brown, PLLC (57) ABSTRACT

The present invention provides a transfer film that allows a transfer layer to have satisfactory transferability and can provide a print with high durability.
The present invention solves the above problem by a transfer film 100 in which an adhesion layer 7, a release layer 2, and a transfer layer 10 are provided in this order on a substrate 1, wherein the transfer layer 10 has a layered structure in which a protective layer 3 and an adhesive layer 5 are layered in this order from the side of the substrate, the protective layer 3 is allowed to contain an active ray-cured resin formed by curing an active ray-curable resin by an active ray, and the adhesion layer 7 is allowed to contain a cured binder resin which is a cured product of a binder resin and a curing agent.

3 Claims, 1 Drawing Sheet

(51) Int. Cl.
- *B44C 1/17* (2006.01)
- *B41M 5/52* (2006.01)
- *B41M 5/50* (2006.01)
- *B41M 5/382* (2006.01)
- *B32B 7/06* (2019.01)
- *B32B 27/40* (2006.01)
- *B32B 27/30* (2006.01)
- *B32B 27/06* (2006.01)
- *B32B 27/08* (2006.01)

(52) U.S. Cl.
CPC ............ *B32B 27/26* (2013.01); *B32B 27/306* (2013.01); *B32B 27/40* (2013.01); *B41M 5/382* (2013.01); *B41M 5/50* (2013.01); *B41M 5/52* (2013.01); *B41M 5/5281* (2013.01); *B44C 1/172* (2013.01)

(58) Field of Classification Search
CPC .... B41M 5/52; B41M 5/5209; B41M 5/5254; B41M 5/5281; B41M 2205/32; B41M 2205/38; B41M 2205/40; B44C 1/172
USPC ............................................ 428/32.79, 32.81
See application file for complete search history.

(56) References Cited

U.S. PATENT DOCUMENTS

| | | |
|---|---|---|
| 2003/0077428 A1 | 4/2003 | Ishida et al. |
| 2009/0303307 A1 | 12/2009 | Yasumatsu |
| 2011/0171429 A1 | 7/2011 | Huang et al. |

FOREIGN PATENT DOCUMENTS

| | | |
|---|---|---|
| JP | H11-291646 A1 | 10/1999 |
| JP | 2003-025745 A1 | 1/2003 |
| WO | 2014/203507 A1 | 12/2014 |
| WO | 2015/170464 A1 | 11/2015 |

OTHER PUBLICATIONS

International Search Report and Written Opinion (Application No. PCT/JP2016/078386) dated Nov. 1, 2016.

TRANSFER FILM

BACKGROUND OF THE INVENTION

1. Field of the Invention

The present invention relates to a transfer film.

2. Description of the Invention

In order to impart durability to the surface of ID cards such as identification paper and IC cards such as bank cards (hereinbelow, these are collectively referred to as cards), an attempt to transfer a transfer layer onto the surface of such cards has been conventionally made by using a transfer film comprising a substrate and a transfer layer including a protective layer provided peelably from the substrate (the film may also be referred to as a protective layer transfer sheet).

As a transfer film, a transfer film comprising a transfer layer in which a protective layer and a layer functioned both as a receiving layer and an adhesive layer are layered in this order from the substrate side (the film may also be referred to as an intermediate transfer medium.) is also known, as proposed in Patent Literature 1. For such transfer films, high transferability is required without causing defective transfer such as tailing and burrs when the transfer layer is transferred. According to the transfer film proposed in Patent Literature 1, it is said that formation of the protective layer by using a urethane-modified acrylate as an ionizing radiation-curable resin may lead to an improvement in the film cutting on transfer and the durability of the protective layer.

Transfer of a transfer layer by using a transfer film is carried out by applying thermal energy on the back side of the transfer film and transferring the transfer layer corresponding to the region to which energy has been applied. Thus, the transfer film is required to have satisfactory transferability. That is, there are required transfer films that cause no defective transfer of a transfer layer or are unlikely to cause defective transfer of a transfer layer. Under such circumstances, a transfer film and the like have been proposed in which a release layer intended to improve the transferability (also referred to as releasability in some cases) of the transfer layer is provided between a substrate and a transfer layer. The release layer is a layer that remains on the side of the substrate when the transfer layer is transferred.

Incidentally, even with a transfer film having a release layer between the substrate and the transfer layer, in the case where the adhesion between the transfer layer and the release layer is high, irregular transfer in which the release layer is transferred together with the transfer layer is likely to occur when the transfer layer is transferred. For example, as proposed in Patent Literature 1, when the protective layer contains an ionizing radiation-curable resin or contains a cured binder resin obtained by curing a binder resin with a curing agent, the adhesion between the protective layer and a layer in contact therewith tends to increase during curing of the resin. Accordingly, when such a protective layer is provided on the release layer, the adhesion between the release layer and the protective layer increases, and the irregular transfer described above may occur depending on the degree of the adhesion.

CITATION LIST

Patent Literature

Patent Literature 1: Japanese Patent Laid-Open No. 2003-25745

SUMMARY OF THE INVENTION

Technical Problem

The present invention has been made in view of the above-mentioned circumstances, and the present invention aims principally to provide a transfer film that allows a transfer layer to have satisfactory transferability and can provide a print with high durability.

Solution to Problem

The present invention for solving the above problem is a transfer film in which an adhesion layer, a release layer, and a transfer layer are provided on a substrate in this order, wherein the transfer layer has a layered structure in which a protective layer and an adhesive layer are layered in this order from the side of the substrate, the protective layer contains an active ray-cured resin formed by curing an active ray-curable resin by an active ray, and the adhesion layer contains a cured binder resin which is a cured product of a binder resin and a curing agent.

The adhesion layer may contain either one or both of a cured polyurethane type resin formed by curing a polyurethane type resin with a curing agent and a cured polyvinyl alcohol type resin formed by curing a polyvinyl alcohol type resin with a curing agent as a cured binder resin. The adhesive layer may be an adhesive layer having the function of a receiving layer.

Advantageous Effect of Invention

According to the present invention, it is possible to make the transferability of the transfer layer satisfactory and to impart very high durability to a print onto which the transfer layer has been transferred.

DETAILED DESCRIPTION OF THE INVENTION

<<Transfer Film>>

Figure 1:
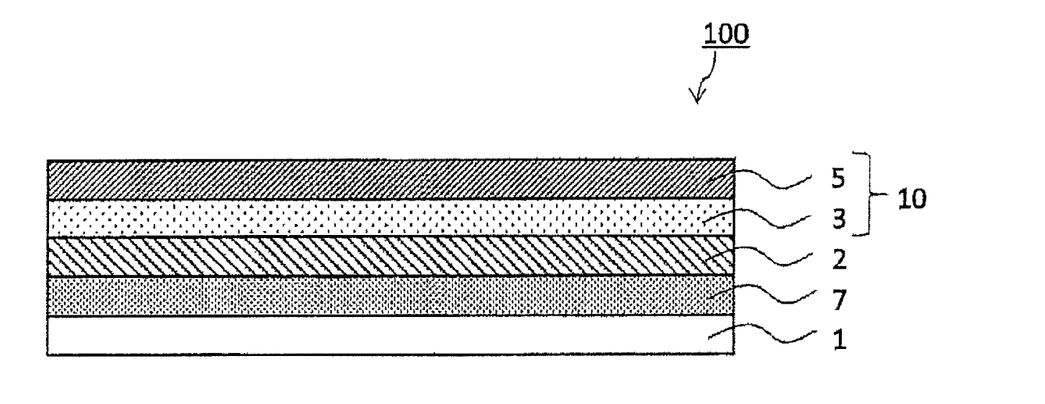
FIG. 1 is a cross-sectional schematic view of a transfer film according to one embodiment of the present invention.

A transfer film 100 of one embodiment of the present invention (hereinbelow, the film is referred to as the transfer film of one embodiment) will be described hereinbelow with reference to the drawing. As shown in FIG. 1, a transfer film 100 of one embodiment includes a substrate 1, an adhesion layer 7, a release layer 2, and a transfer layer 10, wherein the adhesion layer 7, the release layer 2, and the transfer layer 10 are layered in this order from the side of the substrate 1. The transfer layer 10 has a layered structure in which a protective layer 3 and an adhesive layer 5 are layered in this order from the side of the substrate 1 (from the side of the release layer 2).

The transfer film 100 of one embodiment is a transfer film used to transfer the transfer layer 10 onto an optional object (hereinbelow the object is referred to as a transfer receiving article) to thereby obtain a print having high durability. There is no limitation with respect to transfer receiving articles, and examples include card substrates such as IC cards and ID cards and thermal transfer image-receiving sheets where a thermally transferable image has been formed. As a transfer receiving article, things other than these can also be used.

(Substrate)

The substrate 1 is an essential constituent in the transfer film 100 of one embodiment and has the adhesion layer 7, the release layer 2, and the transfer layer 10 provided on one surface of the substrate 1 and a back face layer optionally provided on the other surface of the substrate 1.

There is no particular limitation with respect to the materials of the substrate 1, and it is preferred for the materials to have heat resistance sufficient to endure the thermal energy when the transfer layer 10 is transferred onto a transfer receiving article (e.g., the heat of a thermal head) and to have mechanical strength sufficient to support the release layer 2 and the transfer layer 10 and solvent resistance. Examples of such materials of the substrate 1 can include polyester type resins such as polyethylene terephthalate, polybutylene terephthalate, polyethylene naphthalate, polyethylene terephthalate-isophthalate copolymers, terephthalic acid-cyclohexanedimethanol-ethylene glycol copolymers, and polyethylene terephthalate/polyethylene naphthalate coextruded films, polyamide type resins such as nylon 6 and nylon 66, polyolefin type resins such as polyethylene, polypropylene, and polymethylpentene, vinyl type resins such as polyvinyl chloride, acryl type resins such as polyacrylate, polymethacrylate, and polymethyl methacrylate, imide type resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, polycarbonate, styrene type resins such as polystyrene, high impact polystyrene, acrylonitrile-styrene copolymers (AS resins), and acrylonitrile-butadiene-styrene copolymers (ABS resins), and cellulose type films such as cellophane, cellulose acetate, and nitrocellulose.

The substrate 1 may be a copolymer resin mainly based on a resin exemplified above or a mixed product (including an alloy), or a laminate composed of a plurality of layers. The substrate also may be a stretched film or an unstretched film. For the purpose of improving the strength, films stretched in a uniaxial direction or biaxial direction are preferably used. The substrate 1 is used in the form of a film, sheet or board composed of at least one layer of these resins. Among the substrates composed of the resins exemplified above, polyester type films such as polyethylene terephthalate and polyethylene naphthalate are suitably used due to their excellent thermal resistance and mechanical strength. Among these, polyethylene terephthalate films are more preferable.

For preventing blocking, it is possible to impart asperities to the substrate surface as required. Examples of procedures to form asperities on the substrate include matting agent-kneading processing, sand blast processing, hairline processing, matte coating processing, and chemical etching processing. The matting agent-kneading processing is a processing method for forming a substrate from a resin into which an inorganic material or an organic material is kneaded. The matte coating processing is a processing method for imparting asperities to a substrate surface by coating the substrate surface with a coating agent containing an organic material or an inorganic material.

There is no particular limitation with respect to the thickness of the substrate 1, and the thickness is preferably in the range of 0.5 µm or more and 50 µm or less, more preferably in the range of 4 µm or more and 20 µm or less. By setting the thickness of the substrate 1 within this range, it is possible to sufficiently transmit the thermal energy when the transfer layer 10 is transferred from the transfer film 100 to the transfer layer side and to make a further improvement in the transferability when the transfer layer is transferred. It is also possible to increase the mechanical strength of the substrate 1 and to sufficiently support the transfer layer 10.

The surface of the side in contact with the adhesion layer 7 of the substrate 1 may be subjected to easily-adhesive treatment, in advance, such as corona discharge treatment, plasma treatment, ozone treatment, flame treatment, primer (also referred to as an anchor coat, an adhesion promoter, or an easy-adhesion agent) coating treatment, preheating treatment, dust removing treatment, vapor deposition treatment, alkaline treatment, and addition of an antistatic layer. Additives such as a filling agent, a plasticizer, a colorant, and an antistatic agent may be also added to the substrate as required.

(Release Layer)

As shown in FIG. 1, the release layer 2 is provided between the adhesion layer 7 and the transfer layer 10. The release layer 2 is an essential constituent in the transfer film 100 of one embodiment and is a layer intended to improve transferability (also referred to as releasability in some cases) when the transfer layer 10 is transferred. The release layer 2 is a layer not constituting the transfer layer 10 described below. The release layer 2 is a layer that remains on the side of the substrate 1 when the transfer layer 10 is transferred onto a transfer receiving article.

There is no particular limitation with respect to resins used for the release layer 2, and conventionally known resins having releasability can be appropriately selected and used. Examples of the resin having releasability can include waxes, silicone wax, silicone resins, various silicone-modified resins such as silicone-modified acryl resins, fluorine resins, fluorine-modified resins, polyvinyl alcohol, acryl resins, thermally crosslinkable epoxy-amino resins and thermally crosslinkable alkyd-amino resins, melamine type resins, cellulose type resins, urea type resins, polyolefin type resins, acryl type resins, and cellulosic resins. The release layer 2 may contain one resin solely or may contain two or more resins. Alternatively, the release layer 2 may be formed by using a cross-linking agent such as an isocyanate compound, and a catalyst such as a tin-based catalyst and an aluminum-based catalyst, in addition to the resin having releasability.

Among resins exemplified above, silicone-modified acryl resins are preferred resins from the viewpoint of being able to make a further improvement in the adhesion between the release layer 2 and the adhesion layer 7 described below.

There is no particular limitation with respect to the thickness of the release layer 2, and the thickness is preferably in the range of 0.1 µm or more and 5 µm or less, more preferably in the range of 0.5 µm or more and 2 µm or less.

There is also no particular limitation with respect to the method for forming the release layer 2, and the release layer 2 can be formed by applying a coating liquid for a release layer prepared by dispersing or dissolving the resin exemplified above into an appropriate solvent by a known coating method such as roll coating and gravure coating on the adhesion layer 7, drying the coated layer, and baking the layer at a temperature of the order of 150° C. or more and 200° C. or less.

(Transfer Layer)

As shown in FIG. 1, the transfer layer 10 is provided on the release layer 2. The transfer layer 10 is provided peelably from the substrate 1 and is a layer moving onto a transfer receiving article when thermally transferred. The transfer layer 10 has a layered structure in which the protective layer 3 and the adhesive layer 5 are layered in this order from the side of the substrate 1. The protective layer 3 and the adhesive layer 5 are essential constituents in the transfer film 100 of one embodiment.

(Protective Layer)

The protective layer 3 included in the transfer layer 10 is a layer for imparting durability to a print obtained by transferring the transfer layer 10 onto a transfer receiving article. Incidentally, the protective layer 3 is located nearest of the layers constituting the transfer layer 10 from the substrate 1 and is a layer located on the outermost surface in a print obtained by transferring the transfer layer 10 onto the transfer receiving article.

The protective layer 3 for imparting durability to a print contains an active ray-cured resin formed by curing an active ray-curable resin by an active ray, that is, an active ray-cured resin obtained by irradiating an active ray-curable resin with an active ray, in other words, an active ray-cured resin which is a reaction product of an active ray-curable resin and an active ray (hereinbelow, an active ray-cured resin formed by curing an active ray-curable resin by an active ray is referred to as an active ray-cured resin). Incidentally, the active ray-curable resin referred to in the specification of the present application means a precursor or a composition before irradiated with an active ray. The active ray referred to in the specification of the present application means a radioactive ray which is allowed to chemically act on an active ray-curable resin to promote polymerization. Specific examples include visible light rays, ultraviolet rays, X rays, electron beams, α rays, β rays, and γ rays.

According to the protective layer 3 containing an active ray-cured resin, it is possible to impart very high durability to a print obtained by transferring the transfer layer 10 onto a transfer receiving article. Incidentally, besides physical durability such as abrasion resistance, chemical durability such as solvent resistance and plasticizer resistance is included in the durability referred to herein. In other words, according to the transfer film 100 of one embodiment, it is possible to obtain a print excellent both in physical durability and chemical durability by transferring the transfer layer 10 onto a transfer receiving article.

Subsequently, the active ray-curable resin will be described. The active ray-curable resin as an example comprises, as polymerization components, a composition and the like prepared by appropriately mixing a polymer, a prepolymer, an oligomer and/or a monomer having a polymerizable unsaturated bond such as a (meth)acryloyl group and a (meth)acryloyloxy group or an epoxy group in the molecule.

The active ray-curable resin as an example also comprises a urethane(meth)acrylate as a polymerization component. As the urethane(meth)acrylate, a polyfunctional urethane(meth)acrylate is preferably comprised. As the polyfunctional urethane(meth)acrylate, a urethane(meth)acrylate having 5 or more and 15 or less functional groups is preferable, and a urethane(meth)acrylate having 6 or more and 15 or less functional groups is more preferable. By forming the protective layer 3 using an active ray-curable resin in which the urethane(meth)acrylate has functional groups within the above numerical range, it is possible to make a further improvement in the physical durability and the chemical durability. Incidentally, in the specification of the present application, a urethane(meth)acrylate having 5 or more functional groups is referred to as a polyfunctional urethane (meth)acrylate.

The protective layer 3 contains a polyfunctional urethane (meth)acrylate preferably in the range of 5% by mass or more and 80% by mass or less, more preferably in the range of 10% by mass or more and 50% by mass or less on the basis of the total solid content of the protective layer 3.

From the viewpoint of combining the solvent resistance and the bendability of the protective layer, the protective layer 3 preferably contains either one or both of a urethane (meth)acrylate having 2 or more and 4 or less functional groups and a (meth)acrylate having 2 or more and 5 or less functional groups, together with the above polyfunctional urethane(meth)acrylate. Alternatively, the protective layer 3 contains either one or both of a urethane(meth)acrylate having 2 or more and 4 or less functional groups and a (meth)acrylate having 2 or more and 5 or less functional groups preferably in the range of 5% by mass or more and 80% by mass or less, more preferably in the range of 10% by mass or more and 70% by mass or less, on the basis of the total solid content of the protective layer 3.

Additionally, the mass average molecular weight (Mw) of both of the polyfunctional urethane(meth)acrylate and the urethane(meth)acrylate having 2 or more and 4 or less functional groups is preferably in the range of 400 or more and 20000 or less, more preferably in the range of 500 or more and 10000 or less. When the mass average molecular weight (Mw) of the urethane(meth)acrylate is within the above numerical range, it is possible to improve the abrasion resistance. For a similar reason, the mass average molecular weight (Mw) of the (meth)acrylate having 2 or more and 5 or less functional groups is preferably in the range of 200 or more and 5000 or less. Incidentally, the "mass average molecular weight (Mw)" in the specification of the present application means a value measured by gel permeation chromatography using polystyrene as a standard substance and can be measured by a methods in compliance with DIS-K-7252-1 (2008).

The protective layer 3 may also comprise an unsaturated bond-containing (meth)acryl type copolymer as a polymerization component. Examples of the unsaturated bond-containing (meth)acryl type copolymer include polyester(meth) acrylate, epoxy(meth)acrylate, melamine(meth)acrylate, and triazine(meth)acrylate.

The acid value of the unsaturated bond-containing (meth) acryl type copolymer is preferably in the range of 5 mgKOH/g or more and 500 mgKOH/g or less, more preferably in the range of 10 mgKOH/g or more and 150 mgKOH/g or less. By using an unsaturated bond-containing acryl copolymer having an acid value in the above range, a transfer layer 10 having high surface strength can be obtained. Incidentally, the "acid value" referred in the specification of the present application means the amount of potassium hydroxide in milligrams that is required to neutralize free fatty acid contained in 1 g of a polymer and can be measured by a method in compliance with JIS-K-2501 (2003). The acid value of a polymer can be adjusted as appropriate by adjusting the ratio of monomer components constituting the polymer.

The mass average molecular weight (Mw) of the unsaturated bond-containing (meth)acryl type copolymer is preferably in the range of 3000 or more and 100000 or less, more preferably in the range of 10000 or more and 80000 or less. By setting the mass average molecular weight (Mw) within this range, it is possible to make a further improvement in the chemical durability such as thermal resistance and chemical resistance and the physical durability such as scratch resistance. Additionally, by setting the mass average molecular weight (Mw) within this range, it is possible to prevent gelling reaction during preservation of a coating liquid for a protective layer for forming a protective layer from occurring and to improve the preservation stability of the coating liquid for a protective layer.

The unsaturated bond-containing (meth)acryl type copolymer described above is contained in an active ray-curable resin preferably in the range of 10% by mass or more and 80% by mass or less, more preferably in the range of 20% by mass or more and 70% by mass or less, still more preferably in the range of 20% by mass or more and 50% by mass or less.

The active ray-curable resin may also comprise, as a polymerization component, in addition to the unsaturated bond-containing (meth)acryl type copolymer, an oligomer and/or monomer of (meth)acrylic acid, styrene, vinyl acetate, hydroxyethyl vinyl ether, ethylene glycol divinyl ether, pentaerythritol trivinyl ether, (meth)acrylamide, N-hydroxymethyl(meth)acrylamide, N-vinylformamide, acrylonitrile or the like. The active ray-curable resin may also comprise a prepolymer, oligomer and/or monomer as follows.

Examples of the prepolymer include polyester(meth)acrylates obtained by introducing (meth)acrylic acid into a polyester obtained by bonding a polybasic acid such as adipic acid, trimellitic acid, maleic acid, phthalic acid, terephthalic acid, himic acid, malonic acid, succinic acid, glutaric acid, itaconic acid, pyromellitic acid, fumaric acid, glutaric acid, pimelic acid, sebacic acid, dodecanoic acid, and tetrahydrophthalic acid with a polyhydric alcohol such as ethylene glycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol, and 1,2,6-hexanetriol; epoxy(meth)acrylates obtained by introducing (meth)acrylic acid into an epoxy resin such as bisphenol A-epichlorohydrin-(meth)acrylic acid, phenol novolac-epichlorohydrin-(meth)acrylic acid; urethane(meth)acrylates obtained by introducing (meth)acrylic acid into a urethane resin such as ethylene glycol-adipic acid-tolylene diisocyanate-2-hydroxyethyl acrylate, polyethylene glycol-tolylene diisocyanate-2-hydroxyethyl acrylate, hydroxyethyl phthalyl methacrylate-xylene diisocyanate, 1,2-polybutadiene glycol-tolylene diisocyanate-2-hydroxyethyl acrylate, trimethylolpropane-propylene glycol-tolylene diisocyanate-2-hydroxyethyl acrylate; silicone resin acrylates such as polysiloxane(meth)acrylate and polysiloxane-diisocyanate-2-hydroxyethyl (meth)acrylate, and additionally, alkyd-modified (meth)acrylates obtained by introducing a (meth)acryloyl group into an oil-modified alkyd resin, and spiran resin acrylates.

Examples of the monomer or oligomer include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylates of ε-caprolactone adducts of 1,3-dioxane alcohol, and 1,3-dioxolane acrylate; or methacrylic acid, itaconic acid, crotonic acid, or maleic acid esters obtained by replacing their acrylate by methacrylate, itaconate, crotonate, or maleate; bifunctional acrylic acid esters such as ethylene glycol diacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of neopentyl hydroxypivalate glycol, diacrylate of neopentyl glycol adipate, diacrylates of ε-caprolactone adducts of neopentyl hydroxypivalate glycol, 2-(2-hydroxy-1,1-dimetylethyl)-5-hydroxymethyl-5-ethyl-1,3-dioxane diacrylate, tricyclodecanedimethylol acrylate, ε-caprolactone adducts of tricyclodecanedimethylol acrylate, and diacrylate of diglycidyl ether of 1,6-hexanediol; or methacrylic acid, itaconic acid, crotonic acid, or maleic acid esters obtained by replacing their acrylate by methacrylate, itaconate, crotonate, or maleate; polyfunctional acrylic acid esters such as trimethylolpropane triacrylate, ditrimethylolpropane tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, s-caprolactone adducts of dipentaerythritol hexaacrylate, pyrogallol triacrylate, propionic acid-dipentaerythritol triacrylate, propionic acid-dipentaerythritol tetraacrylate, and hydroxypivalyl aldehyde-modified dimethylolpropane triacrylate; or methacrylic acid, itaconic acid, crotonic acid, or maleic acid esters obtained by replacing their acrylate by methacrylate, itaconate, crotonate, or maleate; phosphazene monomers, triethylene glycol, EO-modified isocyanurate diacrylate, EO-modified isocyanurate triacrylate, dimethyloltricyclodecane diacrylate, trimethylolpropane acrylic acid benzoic acid esters, and alkylene glycol type acrylic acid-modified and urethane-modified acrylates.

There is no particular limitation with respect to the content of the active ray-cured resin, and in the case where higher durability is required, the content of the active ray-cured resin is preferably 30% by mass or more, more preferably 50% by mass or more, on the basis of the total mass of the solid content in the protective layer 3. The upper limit is not particularly limited and can be set as appropriate depending on components to be added optionally and the like. An example is 100% by mass.

The protective layer 3 may also contain other resin together with the active ray-cured resin. Other resin may be one cured with a curing agent or the like or uncured one.

The protective layer 3 may contain other components in addition to the active ray-cured resin. Examples of the other components include a filler. By allowing the protective layer 3 to contain a filler, it is possible to improve the foil cutting property of the transfer layer 10.

Examples of the filler can include organic fillers, inorganic fillers, and fillers of organic-inorganic hybrid type. The filler may also be in a powder or a sol form, but powder fillers are preferably used because of their wide solvent-selectivity when a coating liquid for a protective layer is prepared.

The filler contained in the protective layer 3 is preferably a filler having a volume-average particle size of 1 nm or more and 200 nm or less, more preferably a filler having a volume-average particle size of 1 nm or more and 50 nm or less, still more preferably a filler having a volume-average particle size of 7 nm or more and 25 nm or less. By allowing the protective layer 3 to contain a filler having a volume-average particle size within the range described above, it is possible to make a further improvement in the transferability. Incidentally, the "volume-average particle size" means a volume-average particle size measured in compliance with JIS-Z-8819-2 (2001) and can be measured by using a grain size distribution/particle size distribution analyzer (Nanotrac grain size distribution analyzer, NIKKISO CO., LTD.) in accordance with a known method.

Examples of the powder organic filler can include acryl type particles such as uncrosslinked acryl type particles and crosslinked acryl type particles, polyamide type particles, fluorine type particles, and polyethylene wax. Examples of the powder inorganic filler can include calcium carbonate particles, silica particles, and metal oxide particles such as titanium oxide. Examples of the filler of organic-inorganic hybrid type include ones prepared by hybridizing an acryl resin with silica particles. Additionally, examples of the filler in the sol form can include silica sol types and organosol types. One of these fillers may be used solely, or two or more of these may be mixed and used.

The filler described above is contained in the protective layer 3 preferably in the range of 3% by mass or more and 60% by mass or less, more preferably in the range of 3% by mass or more and 45% by mass or less, still more preferably in the range of 3% by mass or more and 40% by mass or less.

There is no particular limitation with respect to the thickness of the protective layer 3, and the thickness is preferably 1 μm or more and 8 μm or less, more preferably 2 μm or more and 6 μm or less. By setting the thickness of the protective layer 3 within this range, it is possible to make a further improvement in the foil cutting property, and it is also possible to improve the effect of preventing defective transfer such as tailing and burrs. Additionally, it is possible to make a further improvement in the physical durability and the chemical durability imparted to a print obtained by transferring the transfer layer 10 onto a transfer receiving article. Furthermore, it is also possible to prevent defective transfer such as paper peeling and chipping from occurring when the transfer layer 10 is transferred.

There is no particular limitation with respect to the method for forming the protective layer 3, and the protective layer 3 can be formed by forming a coated layer by coating the release layer 2 with a coating liquid for a protective layer composed of a composition including an active ray-curable resin and optional components by a known procedure such as roll coating, reverse roll coating, gravure coating, reverse gravure coating, bar coating, and rod coating, and crosslinking and curing polymerization components described above such as polymerizable copolymers by an active ray. For example, a conventionally-known ultraviolet irradiation apparatus can be used for ultraviolet irradiation. Various apparatuses such as high pressure mercury lamps, low pressure mercury lamps, carbon arcs, xenon arcs, metal halide lamps, non-electrode ultraviolet lamps, and LEDs can be used without limitation. Alternatively, for electron beam irradiation, either of a high energy-type electron beam irradiation apparatus that applies an electronic beam at an energy of 100 keV to 300 keV or a low energy-type electron beam irradiation apparatus that applies an electronic beam at an energy of 100 keV or less may be used. In terms of the irradiation mode, either of a scanning-type irradiation apparatus or a curtain-type irradiation apparatus may be used.

(Adhesive Layer)

As shown in FIG. 1, an adhesive layer 5 is provided on the protective layer 3. The adhesive layer 5 is a layer constituting the transfer layer 10 and used for allowing transfer layer 10 to adhere onto a transfer receiving article when the transfer layer 10 is transferred onto the transfer receiving article. Accordingly, in the transfer film 100 of one embodiment, the adhesive layer 5 is a layer located on the outermost surface.

The adhesive layer 5 may also has a function as a receiving layer capable of receiving the dye of a dye layer. In the case where the adhesive layer 5 has a function of the receiving layer, a print can be obtained by forming a thermally transferable image on the adhesive layer 5 located on the outermost surface of the transfer film 100 of one embodiment by means of a thermal transfer sheet comprising a dye layer and transferring the transfer layer 10 comprising the adhesive layer 5 where the thermally transferable image has been formed onto the transfer receiving article.

There is no particular limitation with respect to materials of the adhesive layer 5, and materials having an adhesive property can be appropriately selected and used. Examples of the material having an adhesive property can include ionomer resins, acid-modified polyolefin type resins, ethylene-(meth)acrylic acid copolymers, ethylene-(meth)acrylic acid ester copolymers, polyester type resins, polyamide type resins, vinyl type resins, (meth)acryl type resins such as acryl type and methacryl type, acrylic acid ester type resins, maleic acid resins, butyral type resins, alkyd resins, polyethylene oxide resins, phenol type resins, urea resins, melamine resins, melamine-alkyd resins, cellulose type resins, polyurethane type resins, polyvinyl ether resins, silicone resins, and rubber type resins. The adhesive layer 5 may contain one material solely or may contain two or more materials. Among the materials exemplified above, vinyl type resins, acryl type resins, butyral type resins, and polyester type resins having a high adhesive property are preferred. Vinyl type resins, acryl type resins, ethylene-(meth) ethyl acrylate copolymers, and acrylic acid ester copolymers are more preferable. Additionally, in the case where the adhesive layer serves a function as a receiving layer, it is possible to use conventionally-known resin materials that easily receive thermally-transferable colorants such as subliming dyes or thermally-fusible inks. Examples include polyolefin type resins such as polypropylene, halogenated resins such as polyvinyl chloride or polyvinylidene chloride, vinyl type resins such as polyvinyl acetate, vinyl chloride-vinyl acetate copolymers, ethylene-vinyl acetate copolymers, or polyacrylic acid esters, polyester resins such as polyethylene terephthalate or polybutylene terephthalate, polystyrene type resins, polyamide type resins, copolymer type resins of an olefin such as ethylene or propylene and other vinyl polymer, cellulose type resins such as ionomers or cellulose diastase, and polycarbonate. Among these, vinyl chloride-vinyl acetate type polymers or polyvinyl chloride resins are preferable, and vinyl chloride-vinyl acetate type polymers are particularly preferable.

There is no particular limitation with respect to the thickness of the adhesive layer, and the thickness is preferably in the range of 0.1 μm or more and 10 μm or less, more preferably in the range of 0.3 μm or more and 3 μm or less.

The adhesive layer 5 can be formed by dissolving or dispersing a single material or a plurality of materials selected from the above-mentioned materials and various additives to be added as required into an appropriate solvent such as water or an organic solvent to prepare a coating liquid for an adhesive layer, applying the liquid by a procedure such as a gravure printing method, a screen printing method, or a reverse-coating method using a gravure plate on the protective layer 3, and drying the applied liquid.

Alternatively, a receiving layer may be further provided between the adhesive layer 5 and the protective layer 3 (not shown). The thickness of the receiving layer is preferably in the range of 0.5 μm or more and 10 μm or less, more preferably in the range of 1 μm or more and 3 μm or less.

(Adhesion Layer)

As described above, in the transfer film 100 of one embodiment, the protective layer 3 containing an active ray-cured resin is located nearest of the layers constituting the transfer layer 10 from the side of the release layer 2 to thereby improve the durability of the protective layer 3. In addition, the release layer 2 is provided in a position in contact with the transfer layer 10 to thereby improve the transferability when the transfer layer 10 is transferred.

In the transfer film 100 of one embodiment, as above, the release layer 2 was coated with a coating liquid for a protective layer containing an active ray-curable resin, which is dried to form a coated film. Subsequently, this coated film is crosslinked and cured by an active ray to form the protective layer 3. In the case where the protective layer 3 is provided on the release layer 2 in this manner, the adhesion between the release layer 2 and the protective layer 3 obtained by crosslinking and curing the coated film increases when the coated film is crosslinked and cured by an active ray. Then, when the transfer layer 10 is transferred onto a transfer receiving article, irregular transfer in which the release layer 2, which is originally supposed to remain on the side of the substrate 1, is transferred together with the transfer layer 10 onto the side of the transfer receiving article is likely to occur.

The transfer film 100 of one embodiment thus has an adhesion layer 7 between the substrate 1 and the release layer 2 in order to reduce unintentional transfer of the release layer, and is characterized in that this adhesion layer 7 contains a cured binder resin which is a cured product of a binder resin and a curing agent, in other words, a cured resin obtained by allowing a curing agent to act on a binder resin, that is, a cured resin obtained by allowing a curing agent to cure a binder resin (hereinbelow, a cured resin obtained by allowing a curing agent to act on a binder resin is referred to as a cured binder resin). The adhesion layer 7 may contain one cured binder resin solely or may contain two or more cured binder resins.

According to the transfer film 100 of one embodiment having this characteristic, it is possible to improve the adhesion between the substrate 1 and the adhesion layer 7 and the adhesion between the adhesion layer 7 and the release layer 2. In other words, it is possible to improve the adhesion between the substrate 1 and the release layer 2, and it is possible to reduce occurrence of irregular transfer in which the release layer 2 is transferred together with the transfer layer 10 onto a transfer receiving article when the transfer layer 10 is transferred onto transfer receiving article.

More specifically, by providing the adhesion layer 7 containing a cured binder resin between the substrate 1 and the release layer 2, it is possible to make the adhesion between the release layer 2 and the adhesion layer 7 higher than the adhesion between the release layer 2 and the protective layer 3 thereby to be able to reduce unintentional transfer of the release layer 2. This is because a layer containing a cured binder resin obtained by allowing a curing agent to cure a binder resin can make the adhesion higher than a layer containing an active ray-cured resin formed by crosslinking and curing an active ray-curable resin by using an active ray can.

<Cured Binder Resin>

There is no particular limitation with respect to the binder resin to obtain a cured binder resin. The resin may be an aqueous binder resin or may be a solvent-based binder resin. Examples of the aqueous binder resin can include polyvinyl pyrrolidone resins, polyvinyl alcohol type resins, polyacrylic acid, polyhydroxyethyl acrylate, water-soluble (or water-dispersible) polyester resins, water-soluble (or water-dispersible) polyurethane type resins, water-dispersible vinyl chloride resins, water-dispersible acryloyl chloride type resins, water-dispersible epoxy resins, gelatin, hydroxyethyl cellulose resins, hydroxypropyl cellulose resins, and carboxymethyl cellulose. The aqueous binder resin means a water-soluble resin or a resin that is insoluble in aqueous solvents but is dispersible in aqueous solvents, such as an emulsion and dispersion. Examples of the aqueous solvent can include water and mixed solvents of water and alcohol.

Examples of the solvent-based binder resin can include polyurethane type resins, polyolefin type resins, halogenated resins such as polyvinyl chloride or polyvinylidene chloride, polyvinyl acetate, vinyl chloride-vinyl acetate type copolymers, ethylene-vinyl acetate copolymers, polyvinyl butyral, polyester resins, polystyrene type resins, polyamide type resins, cellulose type resins, polycarbonate, and acryl type resins. The solvent-based binder resin means a resin soluble or dispersible in organic solvents. Examples of the organic solvent for dissolving or dispersing a solvent-based binder resin can include hydrocarbon type solvents such as hexane and pentane, aromatic type solvents such as xylene, toluene, and benzene, ketone type solvents such as methyl ethyl ketone and acetone, alcohol type solvents such as propanol, ethanol, and methanol, or mixed solvents thereof.

In the case where the resin contained in the release layer 2 is a solvent-based resin, in other words, in the case where the release layer 2 is formed on the adhesion layer 7 by using a coating liquid for a release layer prepared by dissolving or dispersing a solvent-based resin in an organic solvent, an aqueous binder resin is more preferably used as a binder resin for obtaining the cured binder resin contained in the adhesion layer 7. Meanwhile, in the case where the resin contained in the release layer 2 is an aqueous resin, a solvent-based binder resin is preferably used as a binder resin for obtaining the cured binder resin contained in the adhesion layer 7. This combination can reduce mixing of the adhesion layer 7 with the release layer 2 when the release layer 2 is formed on the adhesion layer 7 and thus can further improve the adhesion.

There is no particular limitation with respect to the curing agent to obtain a cured binder resin, and it is only required to appropriately select a curing agent depending on the binder resin to be used. Examples of the curing agent can include isocyanate type curing agents, urethane type curing agents, epoxy type curing agents, melamine type curing agents, urea resin type curing agents, silane coupling agents, metal chelating agents such as titanium chelating agents, zirconium chelating agents, and aluminum chelating agents.

The adhesion layer 7 of a preferred form contains either one or both of a cured polyvinyl alcohol type resin which is a cured product of a polyvinyl alcohol type resin and a curing agent and a cured polyurethane type resin which is a cured product of a polyurethane type resin and a curing agent. In other words, the adhesion layer 7 contains either one or both of a cured polyvinyl alcohol type resin obtained by allowing a curing agent to cure a polyvinyl alcohol type resin and a cured polyurethane type resin obtained by allowing a curing agent to cure a polyurethane type resin. According to the adhesion layer 7 containing a cured polyvinyl alcohol type resin and a cured polyurethane type resin, it is possible to make transfer stability satisfactory, and it is possible to sufficiently reduce unintentional transfer of the release layer 2 by its satisfactory adhesion. Further, it is also possible to reduce tailing which may occur when the transfer layer 10 is transferred. Tailing means a phenomenon in which, when the transfer layer 10 is transferred onto a transfer receiving article, the transfer layer 10 is transferred, originating at the boundary between the region to be transferred and the region not to be transferred of the transfer layer 10, as if protruding from the boundary over the side of the region not to be transferred.

The polyvinyl alcohol type resin referred in the specification of the present application means a resin containing a vinyl alcohol polymer as a constituent and may be a vinyl alcohol homopolymer or a copolymer with other polymerizing component. In the case where a copolymer of vinyl alcohol and other polymerizing component is used as the polyvinyl alcohol type resin, the copolymerization ratio of the vinyl alcohol in the copolymer is preferably 50% or more. As the polyvinyl alcohol type resin, it is possible to use a modified compound obtained by partially modifying polyvinyl alcohol. The polyurethane type resin referred in the specification of the present application means a resin containing a polymer obtained by reaction of a diisocyanate compound with a diol compound.

There is no limitation with respect to the blend ratio between the binder resin and the curing agent to obtain a cured binder resin, and the blend ratio can be appropriately set depending on the binder resin and the curing agent to be used. For example, in the case where a reactive resin having functional groups that react with a curing agent is used as the binder resin, the amounts of the binder resin and the curing agent to be blended are preferably set such that the equivalence ratio of the total number of the functional groups possessed by the curing agent to the total number of the functional groups possessed by the reactive resin is 0.5 or more and 5 or less. As the reactive resin having functional groups that react with the curing agent, a polyurethane type resin having a carboxy group is preferred. In the case where a polyvinyl alcohol type resin is used as the binder resin as described above and a titanium chelating agent is used as the curing agent in order to form an adhesion layer 7 in a preferred form, the amounts of the binder resin and the curing agent to be blended are preferably set such that the content of the polyvinyl alcohol type resin is in the range of 40% or more and 90% or less on the basis of the total mass of the polyvinyl alcohol type resin and the titanium chelating agent. Alternatively, in the case where a polyurethane type resin is used as the binder resin described above and a silane coupling agent is used as the curing agent, the amounts of the binder resin and the curing agent to be blended are preferably set such that the equivalence ratio of the total number of the functional groups possessed by silane coupling agent to the total number of the functional groups possessed by the polyurethane type resin is of the order of 0.5 or more and 5 or less.

There is no particular limitation with respect to the content of the cured binder resin, and the mass of the cured binder resin (the total mass in the case where two or more cured binder resins are contained) is preferably 50% by mass or more on the basis of the total mass of the adhesion layer 7. Allowing the content of the cured binder resin to be 50% by mass or more can make a further improvement in the adhesion between the release layer 2 and the adhesion layer 7. The upper limit is not limited and is 100% by mass.

There is no particular limitation with respect to the thickness of the adhesion layer 7, and the thickness is preferably in the range of 0.02 μm or more and 3 μm or less. Allowing the thickness of the adhesion layer 7 to be in this range can make a further improvement in the adhesion with the release layer 2. Film formation of a stable adhesion layer also can be achieved.

The adhesion layer 7 may also contain optional components in addition to the cured binder resin as required.

There is no particular limitation with respect to the method for forming the adhesion layer 7, and the adhesion layer 7 can be formed by preparing a coating liquid for an adhesion layer containing a binder resin and a curing agent, coating the substrate 1 with this coating liquid for an adhesion layer, and drying the liquid.

(Back Face Layer)

Alternatively, on the surface opposite to the surface of the substrate 1 on which the transfer layer 10 is provided, a back face layer (not shown) for the purpose of improving the thermal resistance, driving stability, and the like can be provided. Incidentally, the back face layer is an optional constituent in the transfer film 100 of one embodiment.

The back face layer may be formed by appropriately selecting a conventionally-known thermoplastic resin and the like. Examples of the thermoplastic resin like this can include thermoplastic resins, such as polyester type resins, polyacrylic acid ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide imide type resins, polycarbonate type resins, polyacrylamide resins, polyvinyl chloride resins, polyvinyl butyral resins, polyvinyl acetoacetal resins, and polyvinyl acetal resins, and silicone modified forms of these.

Further, the back face layer preferably contains various additives for the purpose of improving the slipping property, such as a release agent such as waxes, higher fatty acid amides, phosphoric ester compounds, metal soaps, silicone oils, and surfactants, an organic powder such as a fluorine resin, and inorganic particles such as silica, clay, talc, and calcium carbonate, and particularly preferably contains at least one of the phosphoric ester and metal soap.

The back face layer can be formed, for example, by dispersing or dissolving the above-mentioned thermoplastic resin and various additives to be added as required into an appropriate solvent to prepare a coating liquid for a back face layer, coating the substrate 1 with the coating liquid for a back face layer by a known procedure such as the gravure printing method, the screen printing method, or the reverse roll coating printing method using a gravure plate, and drying the coated layer. The thickness of the back face layer is preferably in the range of 0.1 μm or more and 5 μm or less, more preferably in the range of 0.3 μm or more and 2.0 μm or less, from the viewpoint of an improvement in the heat resistance or the like.

<Transfer of Transfer Layer>

The method for transferring the transfer layer 10 onto a transfer receiving article by using the transfer film 100 of one embodiment may be a known transfer method. For example, known methods such as hot stamping by heat inscription (foil pressing), entire surface or stripe transfer by heat rolling, and a thermal printer (also referred to as a thermal transfer printer) by use of a thermal head (heat-sensitive printing head) can be applied.

As the transfer receiving article, there is no particular limitation in applications as long as they require durability such as abrasion resistance and plasticizer resistance. The transfer receiving article may be, for example, any of natural fiber paper, coated paper, tracing paper, plastic films which are not deformed upon exposure to heat at the time of transfer, glasses, metals, ceramics, woods, cloths, dye-receptive media, and the like. Additionally, from IC cards and the like, designability and a security property are usually required, and thus, in the case where the transfer film 100 of one embodiment comprises no receiving layer, a print layer, a hologram layer or the like is generally provided on the surface of a transfer receiving article onto which the transfer layer 10 is to be transferred.

EXAMPLES

Hereinbelow, the present invention will be described in further detail with reference to Examples, but the present invention is not intended to be limited to these Examples. Unless otherwise specified below, the part is an amount to be blended. With respect to a component of which solid content is shown, a value obtained by multiplying the amount to be blended (part) by the solid content (%) is the mass of the component in a coating liquid (solid content). Hereinbelow, the designation of Tg means a glass transition temperature.

Example 1

A polyethylene terephthalate (PET) film having a thickness of 12 μm was coated with a coating liquid for an adhesion layer 1 having the following composition so as to achieve a thickness of 0.2 μm after drying to thereby form an adhesion layer. Then, this adhesion layer was coated with a coating liquid for a release layer having the following composition so as to achieve a thickness of 1 μm after drying to thereby form a release layer. Then, this release layer was coated with a coating liquid for a protective layer having the following composition by gravure coating so as to achieve a thickness of 6 μm after drying and dried. Then the dried layer was irradiated with ultraviolet rays by using an UV exposure apparatus (Fusion UV, F600V, LH10 lamp, H valve, cold type reflective mirror) to form a protective layer. Then, the protective layer was coated with a coating liquid for a layer functioned both as a receiving layer and an adhesive layer having the following composition by gravure coating so as to achieve a thickness of 2 μm after drying and dried to form a layer functioned both as a receiving layer and an adhesive layer. Thus, the transfer film of Example 1 was obtained in which the adhesion layer, the release layer, and the transfer layer are layered in this order on the substrate. The transfer layer constituting the transfer films of Examples and Comparative Examples means a laminate of a protective layer and a layer functioned both as a receiving layer and an adhesive layer.

| <Coating liquid for an adhesion layer 1> | |
|---|---|
| Urethane resin having carboxy groups (solid content: 35%) (HYDRAN (R) AP40N, DIC Corporation) | 6 parts |
| Epoxysilane compound (as the curing agent) (WSA950, DIC Corporation) | 0.2 parts |
| Water | 10 parts |
| Modified ethanol | 50 parts |

| <Coating liquid for a release layer> | |
|---|---|
| Epoxy group-containing silicone-modified acryl resin (Cell top (R) 226, Daicel Corporation) | 16 parts |
| Aluminum catalyst (solid content 10%) (Cell top (R) CAT-A, Daicel Corporation) | 3 parts |

| <Coating liquid for a release layer> | |
|---|---|
| Toluene | 20 parts |
| Methyl ethyl ketone | 20 parts |

| <Coating liquid for protective layer> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15HA, pentakaidecafunctional, Shin Nakamura Chemical Co., Ltd.) | 30 parts |
| Photopolymerization initiator (IRGACURE (R) 907, BASF Japan) | 5 parts |
| Filler (MEK-AC2140, volume-average particle size 12 nm, Nissan Chemical Industries, Ltd.) | 5 parts |
| Toluene | 200 parts |
| Methyl ethyl ketone | 200 parts |

| <Coating liquid for layer functioned both as receiving layer and adhesive layer> | |
|---|---|
| Vinyl chloride-vinyl acetate copolymer (SOLBIN (R) CNL, Nissin Chemical Industry Co., Ltd.) | 95 parts |
| Epoxy-modified silicone oil (KP-1800U, Shin-Etsu Chemical Co., Ltd.) | 5 parts |
| Toluene | 200 parts |
| Methyl ethyl ketone | 200 parts |

Example 2

The transfer film of Example 2, in which the adhesion layer, the release layer, and the transfer layer are layered in this order on the substrate, was obtained totally in the same manner as in Example 1 except that a coating liquid for an adhesion layer 2 prepared by changing the amount of the epoxysilane compound (WSA950, DIC Corporation) blended in the coating liquid for an adhesion layer 1 from 0.2 parts to 0.1 parts was used instead of the coating liquid for an adhesion layer 1 to form the adhesion layer.

Example 3

The transfer film of Example 3, in which the adhesion layer, the release layer, and the transfer layer are layered in this order on the substrate, was obtained totally in the same manner as in Example 1 except that a coating liquid for an adhesion layer 3 prepared by changing the amount of the epoxysilane compound (WSA950, DIC Corporation) blended in the coating liquid for an adhesion layer 1 from 0.2 parts to 0.4 parts was used instead of the coating liquid for an adhesion layer 1 to form the adhesion layer.

Example 4

The transfer film of Example 4, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer 4 having the following composition.

| <Coating liquid for an adhesion layer 4> | |
|---|---|
| Polyvinyl alcohol (solid content 100%, degree of polymerization 1700) (KURARAY POVAL (R) PVA-117, KURARAY CO., LTD.) | 2.67 parts |
| Titanium chelating agent (as the curing agent) (solid content 42%) (Orgatics (R) TC-300, Matsumoto Fine Chemical Co., Ltd.) | 2.55 parts |
| Water | 45.89 parts |
| Denatured ethanol | 45.89 parts |

Example 5

The transfer film of Example 5, in which the adhesion layer, the release layer, and the transfer layer are layered in this order on the substrate, was obtained totally in the same manner as in Example 1 except that a coating liquid for an adhesion layer 5 prepared by changing the amount of the titanium chelating agent (as the curing agent) (solid content 42%) (Orgatics® TC-300, Matsumoto Fine Chemical Co., Ltd.) blended in the coating liquid for an adhesion layer 4 from 2.55 parts to 5 parts was used instead of the coating liquid for an adhesion layer 1 to form the adhesion layer.

Example 6

The transfer film of Example 6, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer 6 having the following composition.

| <Coating liquid for an adhesion layer 6> | |
|---|---|
| Polyvinyl alcohol resin (degree of polymerization 1700) (KURARAY POVAL (R) PVA-117, KURARAY CO., LTD.) | 1.81 parts |
| Titanium chelating agent (as the curing agent) (solid content 42%) (Orgatics (R) TC-300, Matsumoto Fine Chemical Co., Ltd.) | 4.7 parts |
| Aqueous polyurethane (solid content 22.5%) (HYDRAN (R) AP-40, DIC Corporation) | 1.94 parts |
| Antistatic agent (solid content 30.4%) (Chemistat (R) 6120, Sanyo Chemical Industries, Ltd.) | 2.55 parts |
| Water | 44.5 parts |
| Modified ethanol | 44.5 parts |

Example 7

The transfer film of Example 7, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer 7 having the following composition.

| <Coating liquid for an adhesion layer 7> | |
|---|---|
| Polyester resin (Vylon (R) 200, TOYOBO CO., LTD.) | 3.3 parts |
| Vinyl chloride-vinyl acetate copolymer (SOLBIN (R) CNL, Nissin Chemical Industry Co., Ltd.) | 2.7 parts |
| Isocyanate curing agent (XEL curing agent, DIC Graphics Corporation) | 3 parts |
| Methyl ethyl ketone | 6.7 parts |
| Toluene | 3.3 parts |

Comparative Example 1

The transfer film of Comparative Example 1, in which the release layer and the transfer layer are layered in this order on the substrate, was obtained totally in the same manner as in Example 1 except that no adhesion layer was formed.

Comparative Example 2

The transfer film of Comparative Example 2, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer A having the following composition.

| <Coating liquid for an adhesion layer A> | |
|---|---|
| Acryl resin (BR-87, MITSUBISHI RAYON CO., LTD.) | 15 parts |
| Methyl ethyl ketone | 100 parts |
| Toluene | 100 parts |

Comparative Example 3

The transfer film of Comparative Example 3, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer B having the following composition.

| <Coating liquid for an adhesion layer B> | |
|---|---|
| Cellulose acetate resin (L-20, Daicel Corporation) | 15 parts |
| Methyl ethyl ketone | 100 parts |
| Toluene | 100 parts |

Comparative Example 4

The transfer film of Comparative Example 4, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer C having the following composition.

| <Coating liquid for an adhesion layer C> | |
|---|---|
| Polyester resin (number average molecule weight: 3000, Tg: 53° C.) (Vylon (R) 220, TOYOBO CO., LTD.) | 15 parts |
| Methyl ethyl ketone | 100 parts |
| Toluene | 100 parts |

Comparative Example 5

The transfer film of Comparative Example 5, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer D having the following composition.

| <Coating liquid for an adhesion layer D> | |
|---|---|
| Polyester resin (number average molecule weight: 3000, Tg: 90° C.) (Vylon (R) 700, TOYOBO CO., LTD.) | 15 parts |
| Methyl ethyl ketone | 100 parts |
| Toluene | 100 parts |

Comparative Example 6

The transfer film of Comparative Example 6, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer E having the following composition.

| <Coating liquid for an adhesion layer E> | |
|---|---|
| Polyester resin (number average molecule weight: 20000, Tg: 61° C.) (solid content 30%) (Vylonal (R) MD-1245, TOYOBO CO., LTD.) | 15.21 parts |
| Water | 42.4 parts |
| 2-propanol | 42.39 parts |

Comparative Example 7

The transfer film of Comparative Example 7, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer F having the following composition.

| <Coating liquid for an adhesion layer F> | |
|---|---|
| Urethane resin having carboxy groups (solid content: 35%) (HYDRAN (R) AP40N, DIC Corporation) | 6 parts |
| Water | 10 parts |
| Modified ethanol | 50 parts |

Comparative Example 8

The transfer film of Comparative Example 8, in which the adhesion layer, the release layer, and the transfer layer are layered in this order on the substrate, was obtained totally in the same manner as in Example 1 except that the coating liquid for an adhesion layer 1 was replaced by a coating liquid for an adhesion layer G having the following composition.

| <Coating liquid for an adhesion layer G> | |
|---|---|
| Polyvinyl alcohol resin (solid content 100%, degree of polymerization 1700) (KURARAY POVAL (R) PVA-117, KURARAY CO., LTD.) | 2.67 parts |
| Water | 45.89 parts |
| Modified ethanol | 45.89 parts |

(Transfer of a Transfer Layer (Formation of a Print))

The transfer film of each of Examples and Comparative Examples and a card substrate having the following composition were used in combination. The transfer layer of the transfer film of each of Examples and Comparative Examples was transferred onto the card substrate by means of FARGO HDP-5000 printer (HID Global Corporation) to thereby obtain a print of each of Examples and Comparative Examples.

| <Composition of card substrate> | |
|---|---|
| Polyvinyl chloride compound (degree of polymerization 800) (containing 10% additives such as a stabilizer) | 100 parts |
| White pigment (titanium oxide) | 10 parts |
| Plasticizer (dioctyl phthalate) | 0.5 parts |

(Peeling Stability Evaluation)

The transfer film of each of Examples and Comparative Examples was shaped into a 65 mm-wide strip. The shaped strip of each of Examples and Comparative Examples was affixed onto a Hot stage (HP2000, Shinto Scientific Co., Ltd.) temperature-controlled at 70° C. using transparent double-sided tape (Nice tuck NW-15 15 mm, Nichiban Co., Ltd.) such that the surface of the Hot stage and the transfer layer of the transfer film of each of Examples and Comparative Examples were opposed to each other. Then, in a state in which the transfer film of each of Examples and Comparative Examples was kept at 70° C., the transfer layer of this thermal transfer sheet was peeled off under conditions including a peel angle of 90° and a peel rate of 5 mm/sec. The peeling force from a point 5 mm distant in the peeling direction from the starting point of peeling to a point 15 mm distant in the peeling direction from the starting point of peeling (peel length: 10 mm) was measured by a round spring-type tension gauge. The average value of the peeling force in this peel length range was calculated. The calculation of the average value of this peeling force was carried out three times for the transfer film of each of Examples and Comparative Examples. Among this three calculations of the average value of the peeling force, the largest average value of the peeling force was taken as peeling force A, the smallest average value of the peeling force was taken as peeling force C, and the medium average value of the peeling force was taken as peeling force B. The variation value of the peeling force was calculated based on the following expression (1), and the peeling stability was evaluated based on the following evaluation criteria. Evaluation results are shown in Table 1.

Variation value of peeling force=peeling force $A$/peeling force $C$   Expression (1)

"Evaluation Criteria"

A: Variation value of the peeling force is 1 or more and less than 1.75, and the average value of peeling force A, peeling force B, and peeling force C is 20 g or more and less than 100 g.

B: Variation value of the peeling force is 1 or more and less than 1.75, and the average value of peeling force A, peeling force B, and peeling force C is less than 20 g or 100 g or more and less than 200 g.
NG: Variation value of the peeling force is 1.75 or more, or the average value of peeling force A, peeling force B, and peeling force C is 200 g or more.

(Tailing Evaluation)

The print of each of Examples and Comparative Examples was visually checked and tailing evaluation was carried out based on the following evaluation criteria. Evaluation results are shown in Table 1.

"Evaluation Criteria"
A: Little tailing occurs (1 mm or less).
B: Tailing occurs (larger than 1 mm and 2 mm or less).
NG: Tailing considerably occurs (larger than 2 mm).

(Transferability Evaluation)

The print of each of Examples and Comparative Examples was visually checked, and the transferability evaluation was carried out based on the following evaluation criteria. Evaluation results are shown in Table 1.

"Evaluation Criteria"
A: Only the transfer layer is precisely transferred.
B: Only the transfer layer is transferred onto the side of the card substrate.
NG: The release layer and the adhesion layer together with the transfer layer are entirely transferred onto the side of the card substrate.

(Surface Strength Evaluation)

Abrasion resistance test (Taber test) of the print of each of Examples and Comparative Example obtained by transfer of the transfer layer described above was carried out in compliance with ANSI-INCITS322-2002, 5.9 Surface Abrasion for 3000 cycles. The condition of the surface of the print of each of Examples and Comparative Example was visually checked every 100 cycles, and surface strength evaluation was carried out based on the following evaluation criteria. Evaluation results are shown in Table 1. Additionally, upon carrying out surface strength evaluation, the abrasion wheel (abrasion wheel: CS-10F, load: 500 gf) was ground every 300 cycles.

"Evaluation Criteria"
A: The surface condition after 3000 cycles have been carried out is satisfactory.
B: The surface condition after 2000 cycles have been carried out is satisfactory, but the surface condition after 3000 cycles have been carried out is not satisfactory.
C: The surface condition after 1000 cycles has been carried out is not satisfactory, but practically, it is not at a level that becomes a problem.
NG: The surface condition after 100 cycles have been carried out is not satisfactory.

TABLE 1

|  | Peeling stability evaluation | Tailing evaluation | Transferability evaluation | Surface strength evaluation |
|---|---|---|---|---|
| Example 1 | A | A | A | A |
| Example 2 | A | A | A | A |

TABLE 1-continued

|  | Peeling stability evaluation | Tailing evaluation | Transferability evaluation | Surface strength evaluation |
|---|---|---|---|---|
| Example 3 | A | A | A | A |
| Example 4 | A | A | A | A |
| Example 5 | A | A | A | A |
| Example 6 | A | A | A | A |
| Example 7 | B | B | A | A |
| Comparative Example 1 | A | NG | NG | A |
| Comparative Example 2 | B | NG | NG | A |
| Comparative Example 3 | B | NG | NG | A |
| Comparative Example 4 | NG | A | NG | B |
| Comparative Example 5 | NG | A | NG | B |
| Comparative Example 6 | NG | A | NG | B |
| Comparative Example 7 | NG | NG | NG | B |
| Comparative Example 8 | B | NG | NG | A |

REFERENCE SIGNS LIST 100 transfer film
1 substrate
2 release layer
3 protective layer
5 adhesive layer
7 adhesion layer
10 transfer layer

The invention claimed is:

1. A transfer film comprising:
a substrate; and
an adhesion layer, a release layer and a transfer layer, provided in this order, on the substrate,
wherein the transfer layer has a layered structure including a protective layer and an adhesive layer, provided in this order, from the side of the substrate,
wherein the protective layer contains an active ray-cured resin formed by curing an active ray-curable resin by an active ray, and
wherein the adhesion layer contains at least one of a cured polyurethane type resin, which is a cured product of a polyurethane type resin and a curing agent, and a cured polyvinyl alcohol type resin, which is a cured product of a polyvinyl alcohol type resin and the curing agent, and wherein the curing agent is an epoxysilane compound or a titanium chelating agent.

2. The transfer film according to claim 1, wherein the adhesive layer has a function of a receiving layer.

3. The transfer film according to claim 1, wherein the adhesive layer has a function of a receiving layer.

* * * * *